US011933257B2

(12) United States Patent
Marrack

(10) Patent No.: US 11,933,257 B2
(45) Date of Patent: Mar. 19, 2024

(54) FUEL INJECTOR LIFT CONTROL

(71) Applicant: Caterpillar Inc., Peoria, IL (US)

(72) Inventor: Andrew O. Marrack, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/655,499

(22) Filed: Mar. 18, 2022

(65) Prior Publication Data

US 2023/0296070 A1 Sep. 21, 2023

(51) Int. Cl.

*F02M 47/02* (2006.01)
*F02D 41/40* (2006.01)
*F02M 61/10* (2006.01)

(52) U.S. Cl.

CPC ........... *F02M 47/027* (2013.01); *F02D 41/40* (2013.01); *F02M 61/10* (2013.01)

(58) Field of Classification Search

CPC ........... F02M 21/0245; F02M 37/0052; F02M 43/04; F02M 45/00; F02M 47/02; F02M 47/027; F02M 55/025; F02M 59/34; F02M 61/10; F02M 63/00; F02M 63/0015; F02M 63/0029; F02D 41/14; F02D 41/1406; F02D 41/38; F02D 41/3826; F02D 41/20; F02D 41/221; F02D 41/062; F02D 41/36; F02D 41/3845; F02D 2041/2055; F02D 2041/225; F02D 2041/3881

USPC ................................ 123/470, 472, 481, 490

See application file for complete search history.

(56) References Cited

U.S. PATENT DOCUMENTS 4,440,133 A * 4/1984 Jourde ................. F02M 59/105 123/446
5,458,293 A * 10/1995 Ganser ................... F02M 45/08 239/533.8
5,915,361 A * 6/1999 Heinz ................ F02M 63/0045 123/458
6,021,760 A * 2/2000 Boecking ............ F02M 47/027 123/446
6,145,492 A * 11/2000 Lixl ..................... F02M 47/027 239/96
6,422,211 B1 * 7/2002 Boecking ........... F02M 63/0026 123/458
6,886,535 B2 * 5/2005 Boehland ............... F02M 45/06 123/446
6,932,281 B2 * 8/2005 Boecking ........... F02M 63/0007 239/585.1
6,955,114 B2 10/2005 Stockner et al.

(Continued)

FOREIGN PATENT DOCUMENTS

DE 10218548 A1 11/2002
DE 102004021409 B4 2/2015

*Primary Examiner* — John Kwon
*Assistant Examiner* — Johnny H Hoang
(74) *Attorney, Agent, or Firm* — Bookoff McAndrews, PLLC

(57) ABSTRACT

A fuel injection system includes a fuel supply passage configured to receive a pressurized fuel, a nozzle orifice downstream of the fuel supply passage, and an injection valve positionable to open the nozzle orifice and to close the nozzle orifice. The injection valve has a first configuration with a first lift and a second configuration with a second lift, the first lift being different than the second lift. The fuel injection system includes a fluid-actuated lift control valve configured to cause the injection valve to change from the first configuration to the second configuration.

20 Claims, 4 Drawing Sheets

(56) References Cited

U.S. PATENT DOCUMENTS

| | | | | |
|---|---|---|---|---|
| 6,981,653 | B2 * | 1/2006 | Boehland | F02M 45/04 239/91 |
| 7,111,613 | B1 * | 9/2006 | Barnes | F02M 47/027 239/533.8 |
| 7,506,825 | B2 * | 3/2009 | Gibson | F02M 63/0035 239/533.1 |
| 7,578,283 | B1 | 8/2009 | Bartley | |
| 10,941,738 | B1 * | 3/2021 | Puckett | F02D 41/38 |
| 2010/0096473 | A1 * | 4/2010 | Coldren | F02M 63/0063 239/90 |
| 2010/0133361 | A1 * | 6/2010 | Futonagane | F02M 45/086 239/533.12 |
| 2011/0108631 | A1 * | 5/2011 | Mumford | F02D 19/0642 239/429 |
| 2014/0361096 | A1 * | 12/2014 | Hokkanen | F02M 63/029 239/91 |
| 2014/0373806 | A1 * | 12/2014 | Hou | F02M 59/105 123/294 |
| 2015/0369160 | A1 | 12/2015 | Tanis et al. | |
| 2016/0123286 | A1 * | 5/2016 | Hou | F02M 45/086 123/304 |
| 2018/0100475 | A1 * | 4/2018 | Shafer | F02M 63/0265 |
| 2018/0112614 | A1 * | 4/2018 | Makino | F02D 41/20 |
| 2020/0318596 | A1 * | 10/2020 | Schoefbaenker | F02M 47/027 |

* cited by examiner

FUEL INJECTOR LIFT CONTROL

TECHNICAL FIELD

The present disclosure relates generally to methods and systems for internal combustion engine components and, more particularly, to systems and methods for a fuel injection system with controllable lift.

BACKGROUND

Many internal combustion engines include fuel injectors to supply fuel to combustion cylinders. These fuel injectors control the power output by the engine by changing injection quantity according to a requested output and current engine conditions. The quantity of fuel can vary widely, with the amount of fuel injected when the engine operates at maximum output being significantly larger than the amount of fuel injected when the engine operates at low load or idles. While fuel injectors with lower maximum outputs are suitable for injecting small quantities of fuel, engine systems with large outputs employ fuel injectors capable of injecting a large quantity of fuel. These high-output fuel injectors can have a high turndown ratio, the ratio of the maximum quantity of fuel that can be injected to the smallest quantity of fuel that can be injected.

While some high turn-down ratio fuel injectors operate in a satisfactory manner when the engine is operating under moderate or high loads, they are less accurate when small fuel quantities are needed. As a result, these injectors can inject fuel at a faster rate than desired, especially during injection events that include a small pilot injection or when the engine is idling or under a low load. Injecting more fuel than desired under these conditions can cause issues such as unwanted noise, increased emissions of undesirable compounds, and reduced engine stability.

A fuel injector system is described in DE 10218548 A1 ("the '548 publication") to Takaki et al. The fuel injector in the '548 publication changes fuel injection quantity by using a piezoelectric actuator that modifies the amount of travel of a needle valve member. The piezoelectric actuator moves a piston between a series of positions, including a raised position associated with an off state, intermediate positions, and a lowered position. The position of the piston affects the operation of a control chamber at a proximal end of a piston. While the fuel injector described in the '548 publication may be useful in some situations, it requires the use of a piezoelectric actuator, resulting in increased complexity and power requirements.

The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a fuel injection system may include a fuel supply passage configured to receive a pressurized fuel, a nozzle orifice downstream of the fuel supply passage, and an injection valve positionable to open the nozzle orifice and to close the nozzle orifice. The injection valve may have a first configuration with a first lift and a second configuration with a second lift, the first lift being different than the second lift. The fuel injection system may also include a fluid-actuated lift control valve configured to cause the injection valve to change from the first configuration to the second configuration.

In another aspect, a fuel injection system may include a nozzle orifice configured to inject fuel into an internal combustion engine and a needle valve assembly configured to open and close the nozzle orifice, the needle valve assembly including an extendable body that, in an extended position, reduces a maximum lift of the needle valve assembly by expanding a length of the needle valve assembly. The fuel injection system may also include a control assembly configured to cause the body of the needle valve to extend.

In yet another aspect, a fuel injection method may include receiving fuel with a fuel injector, pressurizing the fuel for injection into an internal combustion engine via an injection member assembly, and actuating a lift control valve between a first position and a second position, the second position associated with a reduced amount of lift as compared to the first position. The method may include injecting the pressurized fuel with an injection rate that is controlled according to the reduced amount of lift of the injection valve in the second position.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a method or apparatus that comprises a list of elements does not include only those elements, but may include other elements not expressly listed or inherent to such a method or apparatus. In this disclosure, relative terms, such as, for example, "about," "substantially," "generally," and "approximately" are used to indicate a possible variation of ±10% in the stated value or characteristic.

Figure 1:
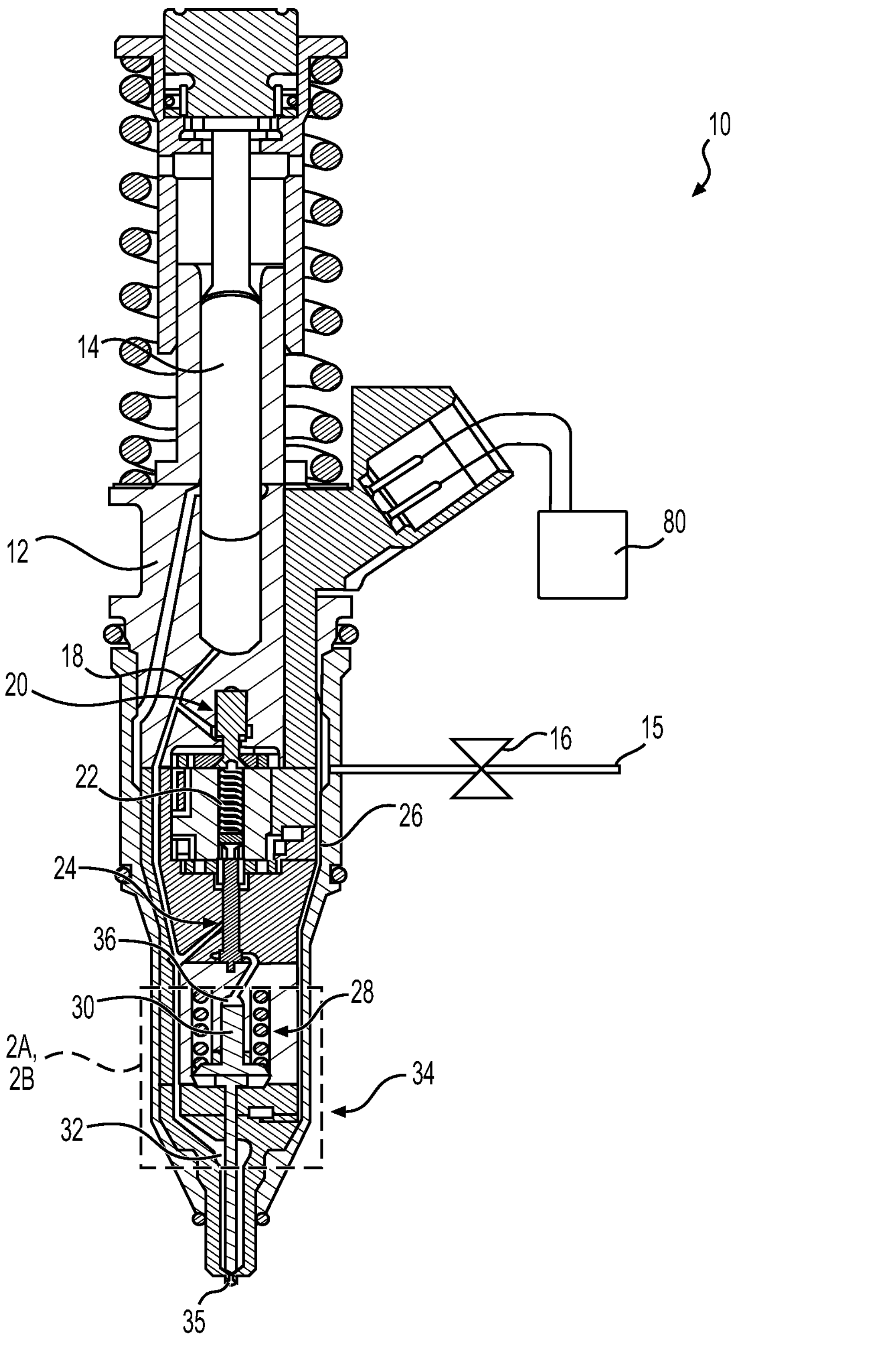
FIG. 1 is a schematic cross-sectional view of a fuel injector lift control system, according to aspects of the disclosure.

FIG. 1 illustrates an exemplary fuel injection system, and in particular, a fuel injector lift control system 10, according to aspects of the invention. Fuel injector lift control system 10 may be included in an internal combustion engine to facilitate accurate injections of both small and large amounts of fuel into a combustion chamber (not shown). An exemplary fuel injector lift control system 10 may include a plurality of fuel injectors 12 (one fuel injector 12 shown in FIG. 1), a fuel supply system and pressure control valve 16 to provide fuel to a plurality of fuel injectors 12, and an electronic control module (ECM) 80. The fuel supply system for lift control system 10 may be connected to the plurality of fuel injectors 12 and may include a fuel supply 15 and one or more pressure control valves 16 and/or other pressure regulation devices to supply fuel with a relatively low pressure to fuel injector 12. Pressure control valve 16 may be an electronically-controlled valve (e.g., a scroll valve or a solenoid valve) configured to adjust the pressure of fuel supplied with the fuel supply system to a series of fuel injectors 12.

Fuel injector 12 may be a mechanically-actuated electronically-controlled unit fuel injector that includes a cam-driven piston 14, a fuel supply passage 18, to receive pressurized fuel, fuel supply passage 18 being connected downstream of piston 14, a spill valve 20, a control valve 24, an injection valve 28, and a lift control valve 34. Fuel injector 12 may be in communication with ECM 80, such that spill valve 20, control valve 24, and valve 16 are responsive to commands issued with ECM 80.

Spill valve 20 may be a normally-open valve including a valve member movable between an open position in which fuel drains via a return to the fuel supply system, and a closed position. Spill valve 20 may include a solenoid that is energized in response to commands from ECM 80, the energized state acting to move spill valve 20 to the closed position. Control valve 24 may be connected between pressurized fuel supply passage 18 and a control chamber 36. Control valve 24 may have a non-injection position in which control chamber 36 receives pressurized fuel, and an injection position in which control chamber 36 is depressurized. A spring member 22 may bias spill valve 20 to the open position and bias control valve 24 to the non-injection position.

Injection valve 28 may be formed as a one-way valve, such as a needle valve having a closed position and an open position. Injection valve 28 may include an injection member assembly 30, a nozzle chamber 32, and one or more nozzle orifices 35. Injection valve 28 may be a variable-lift valve, a valve configured to have a first lift and a second lift, the first lift being a full lift, the second lift being a reduced lift. The configuration associated with the first lift is also referred to herein as an unrestricted configuration, while the configuration associated with the second lift is also referred to herein as the restricted configuration. As used herein, “lift” refers to the distance of a distal end of the valve from the valve seat when the valve member injects fuel. In particular, “lift” can represent the distance that injection member assembly 30 travels away from a valve seat for nozzle orifices 35.

Lift control valve 34 may be connected to pressurized fuel passage 18 and a low-pressure fuel supply 26 within fuel injector 12. Lift control valve 34 may be a control assembly configured to control whether injection valve 28 is in an unrestricted configuration associated with the first lift or a restricted configuration for the second lift, as described below.

ECM 80 may be enabled, via programming, to generate commands that control fuel injection events and commands that control a configuration of injection member assembly 30. In particular, ECM 80 may be configured to generate commands for actuating spill valve 20, control valve 24, and valve 16. ECM 80 may also be configured, via programming, to determine when a small fuel injection is desirable, such as a pilot injection, or main injections that occur when the engine is in a low load or idle condition. In response to this determination, ECM 80 may be configured to generate commands (e.g., commands to valve 16) that cause a reduction of the lift of injection valve 28 or an increase in the lift of injection valve 28.

ECM 80 may embody a single microprocessor or multiple microprocessors that receive inputs and generate outputs. ECM 80 may include a memory, a secondary storage device, a processor such as a central processing unit, or any other means for accomplishing a task consistent with the present disclosure. The memory or secondary storage device associated with ECM 80 may store data and software to allow ECM 80 to perform its functions, including the functions described with respect to method 200, described below. Numerous commercially available microprocessors can be configured to perform the functions of ECM 80. Various other known circuits may be associated with ECM 80, including signal-conditioning circuitry, communication circuitry, and other appropriate circuitry.

Figure 2B:
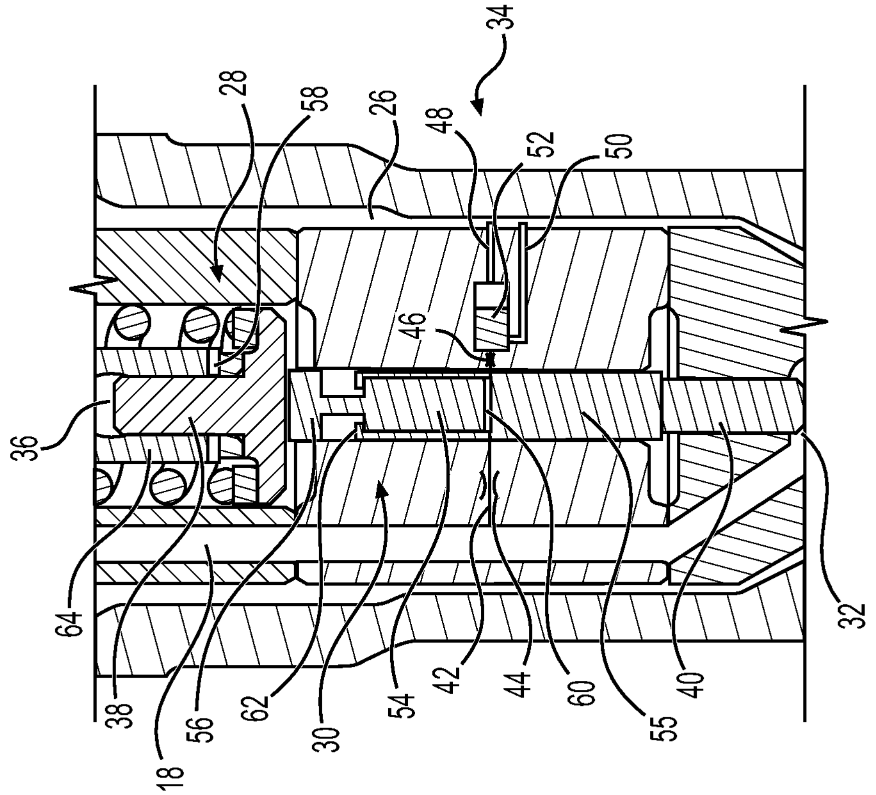
FIG. 2B is an enlarged cross-sectional view with the injection valve in a restricted configuration.
Figure 2A:
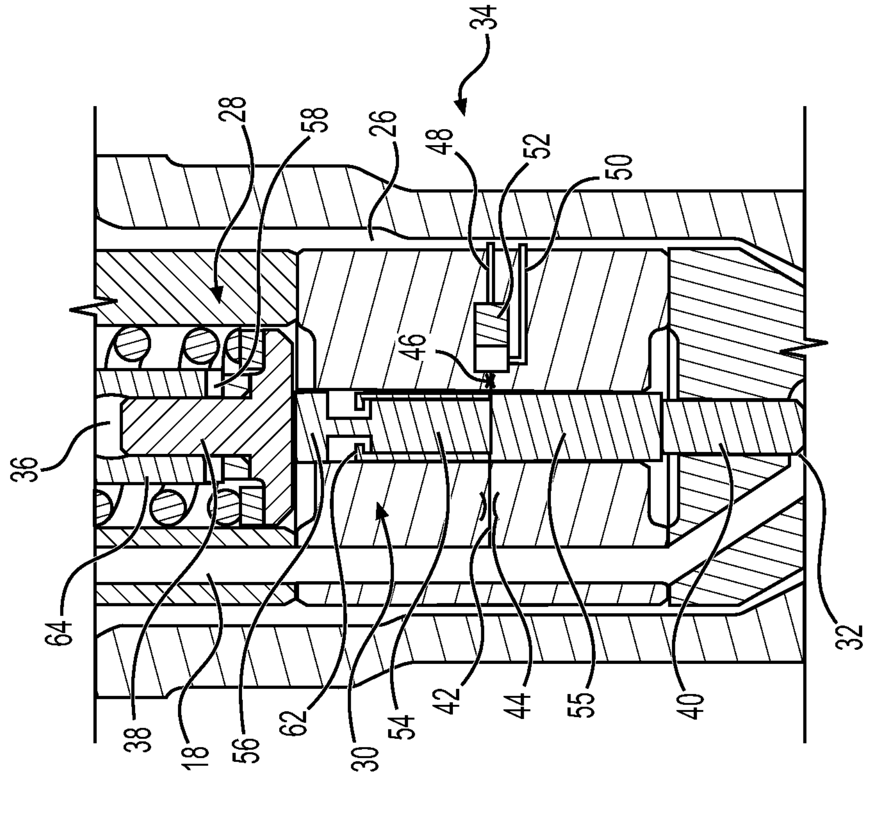
FIG. 2A is an enlarged cross-sectional view of a portion of the fuel injector lift control system of FIG. 1 with an injection valve in an unrestricted configuration.

FIGS. 2A and 2B are enlarged cross-sectional views of injection member assembly 30 and lift control valve 34, representing the portion of injector 12 enclosed within the dashed-line box 2A, 2B shown in FIG. 1. FIG. 2A illustrates injection member assembly 30 in the unrestricted configuration, while FIG. 2B illustrates injection member assembly 30 in the restricted configuration. As shown in FIGS. 2A and 2B, injection member assembly 30 may be a multi-component assembly that forms a needle member of injection valve 28.

A distal portion 40 may form a distal end of injection member assembly 30 that closes and opens one or more nozzle orifices 35 (bottom of FIG. 1). A securing body 55 may include a hollow interior configured to receive and secure an extendable body 54 of injection member assembly 30. Securing body 55 may be integral with a distal portion 40, or may be formed with distal portion 40 so as to form a monolithic structure. The proximal end of securing body 55 may include a lift element stop 62 to prohibit travel of extendable body 54 beyond a fully extended position (FIG. 2B). An extendable body 54 may include a distal end secured within securing body 55 and a proximal piston end 56. Piston end 56 may be in contact with or integrated with a proximal stem 38 of injection member assembly 30.

In the unrestricted configuration illustrated in FIG. 2A, proximal stem 38 may form a gap 58 with an injection valve stop 64. Gap 58 may correspond to the maximum lift of injection member assembly 30. In the restricted configuration shown in FIG. 2B, gap 58 may be reduced.

In the restricted configuration of injection valve 28, gap 58, or the lift of injection valve 28, may be reduced by 10%, 30%, 50%, or more than 50%, as compared to the unrestricted amount of lift. Gap 58 in FIGS. 2A and 2B represents the amount of space available for injection member assembly 30 to travel, or lift, during injection. Thus, FIGS. 2A and 2B represent fuel injector 12 in a non-injection state. During injection of fuel, each gap 58 may close as injection member assembly 30 moves away from nozzle orifices 35.

Lift control valve 34 may be configured for fluid communication with pressurized fuel passage 18. For example, as shown in FIGS. 2A and 2B, lift control valve 34 may include a high-pressure supply passage 42 having a high-pressure orifice 44, a low-pressure orifice 46, a biasing passage 48, and a drain passage 50. A hydraulic fluid chamber 60 (FIG. 2B), within injection member assembly 30, may be formed as a space below extendable body 54 within the hollow interior of securing body 55. Hydraulic fluid chamber 60 may be connected between orifice 44 and orifice 46 as part of a fluid path that extends to drain passage 50 from pressurized fuel passage 18 via supply passage 42.

For example, through-holes or passages may be formed in securing body 55 at opposite ends of hydraulic fluid chamber 60 to provide fluid communication between hydraulic fluid chamber 60 and pressurized fuel passage 18 (via high-pressure supply passage 42 and high-pressure orifice 44) and between fluid chamber 60 and low-pressure fuel supply 26 (via low-pressure orifice 46 and drain passage 50).

In a first position represented in FIG. 2A, lift control valve 34 may be open, with a lift control element 52 in a location that enables fluid communication between pressurized fuel passage 18, high-pressure supply passage 42, and drain passage 50. While hydraulic fluid chamber 60 is not shown in FIG. 2A due to injection member assembly 30 being in a contracted or collapsed configuration, as understood, a relatively thin layer of hydraulic fluid (e.g., fuel) may be present at the proximal end of extendable body 54. This layer of fluid may drain from chamber 60 via drain passage 50. In a second position represented in FIG. 2B, which corresponds to an expanded configuration of injection member assembly 30, lift control valve 34 may be closed, with lift control element 52 in a location that blocks fluid communication between hydraulic fluid chamber 60 and low-pressure fuel supply 26 via drain passage 50.

Lift control element 52 (e.g., a piston) may be controllably displaceable between the first position shown in FIG. 2A and the second position shown in FIG. 2B. Biasing passage 48 and drain passage 50 may be connected to low-pressure fuel supply 26 in a manner that allows biasing passage 48 to act as a control passage. For example, biasing passage 48 may allow lift control element 52 to open when a first pressure of fuel is provided to low-pressure fuel supply 26 with pressure control valve 16. At this first pressure, fluid from pressurized fuel passage 18 that enters passage 42 and passes through orifice 46 may have a force that overcomes the force generated by the pressure of fluid within passage 48, driving lift control element 52 to the open position and allowing fluid from pressurized fuel passage 18 to drain through drain passage 50 after passing through high-pressure supply passage 42, hydraulic fluid chamber 60, and low-pressure orifice 46. When low-pressure fuel supply 26 is provided with a second pressure of fuel that is higher than this first pressure, the force of fluid within biasing passage 48 may drive lift control element 52 to the closed position, preventing fluid from pressurized fuel passage 18 from draining through drain passage 50, and closing a fluid path from fuel passage 18 to drain passage 50.

In some aspects, lift control valve 34 may be biased to a particular configuration. In particular, biasing passage 48 may have a size that retains element 52 to the closed position shown in FIG. 3B, with the diameters of high-pressure orifice 44 and low-pressure orifice 46 being set to facilitate this biasing. For example, the diameter of high-pressure orifice 44 may be set to reduce the pressure of fluid from pressurized fuel passage 18 by a first amount. The diameter of low-pressure orifice 46 may be set to further reduce this pressure, the further-reduced pressure acting on lift control element 52. The pressure acting on lift control element 52 may be set such that pressure control valve 16 is configured to supply fluid to biasing passage 48 at a first level, generating a force that does not overcome the force of pressure of fluid from low-pressure orifice 46 (represented in FIG. 2A) and a second level generating a force that does overcome the force of fluid from orifice 46 (represented in FIG. 2B).

INDUSTRIAL APPLICABILITY

System 10 may be useful in any internal combustion engine, such as liquid fuel (e.g., diesel, gasoline, etc.) engines, gaseous fuel engines, or dual-fuel engines (engines configured to combust both liquid fuel and gaseous fuel). System 10 may be utilized for generating power in a stationary machine (e.g., a generator or other electricity-generating device), in a mobile machine (e.g., an earthmoving device, a hauling truck, a drilling machine, etc.), or in other applications in which it is beneficial to control and/or adjust the amount of lift in fuel injection events for one or more fuel injectors 12.

During an injection event, the pressure of fuel within pressurized fuel passage 18 (FIG. 1) may increase when spill valve 20 is closed and a cam drives piston 14 downward. Control valve 24 may control whether fluid (e.g., fuel) within control chamber 36 is pressurized. When an injection is desired, ECM 80 may cause control valve 24 to move from the resting non-injection position in which high pressure fluid is present within control chamber 36 to the injection position in which control chamber 36 is connected to a low-pressure fuel drain. For example, ECM 80 may generate a command for supplying electrical energy to a solenoid for moving control valve 24 to the injection position. In the non-injection position, injection control valve 24 may block the injection of fuel, as pressurized fluid within control chamber 36 prevents fluid within nozzle chamber 32 from lifting injection member assembly 30 and opening one or more nozzle orifices 35. However, when control valve 24 is in the injection position, movement of injection member assembly 30 may be permitted by connecting control chamber 36 with a low-pressure fluid passage (e.g., a fluid drain).

Upward movement of injection member assembly 30 during an injection may be restricted by injection valve stop 64 (FIGS. 2A and 2B) fixed in place within injector 12. Thus, an amount of lift of injection member assembly 30 may be set by a gap 58 between injection valve stop 64 and proximal stem 38. In the collapsed configuration of injection member assembly 30 (FIG. 2A), gap 58 may be relatively large as compared to gap 58 formed in the expanded configuration of injection member assembly 30 (FIG. 2B).

Figures 3A, 3B:
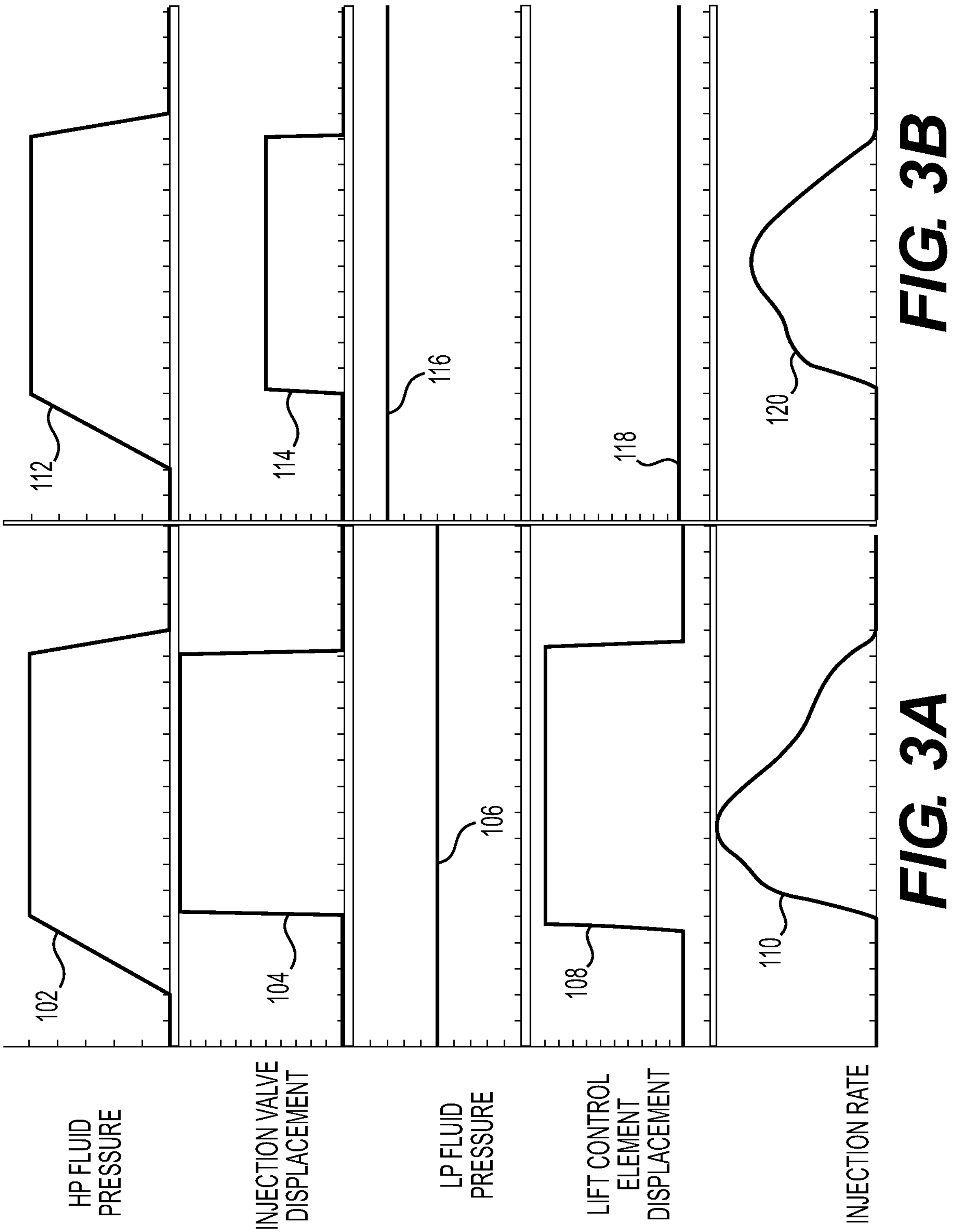
FIG. 3A is a chart illustrating fuel injector conditions for an injection event with full valve lift, according to aspects of the disclosure.
FIG. 3B is a chart illustrating fuel injector conditions for an injection event with reduced valve lift, according to aspects of the disclosure.

FIGS. 3A and 3B include charts representing the operation of system 10 when lift control valve 34 is actuated for a relatively higher, or full, lift (FIG. 3A) during fuel injection, or remains in a closed position for reducing valve lift (FIG. 3B). During a full-lift injection event, represented in FIG. 3A, lift control element 52 may transition between the two positions represented in FIGS. 2A and 2B. For example, as described below, lift control element displacement 108 includes a lower level that represents the closed state of lift control valve 34, with lift control element 52 blocking drain passage 50, as shown in FIG. 2B. The higher level of lift control element displacement 108 may correspond to the open state of lift control valve 34, with high-pressure supply passage 42 and drain passage 50 being in fluid communication with each other to prevent accumulation of hydraulic fluid within hydraulic fluid chamber 60, as shown in FIG. 2A.

FIGS. 3A and 3B each illustrate, on respective y-axes, a pressure 102, 112 of high-pressure fluid ("HP fluid pressure") in pressurized fuel passage 18 and supply passage 42, an injection valve displacement 104, 114, representing the position of injection member assembly 30, a pressure 106, 116 of low-pressure fluid ("LP fluid pressure") in low-pressure fuel supply 26, a lift control element displacement 108, 118 representing the position of lift control element 52, and an injection rate 110, 120 representing the rate of fuel injection from fuel injector 12 via nozzle orifices 35. FIG. 3A and FIG. 3B each represent a portion or an entirety of a single injection event. For example, FIGS. 3A and 3B may represent only a pilot injection of fuel that is part of an injection event that includes a pilot injection, a main injection, and if desired, a post injection. Alternatively, FIGS. 3A and 3B may represent a single main injection that forms an entire injection event. As understood, the magnitude of pressures of LP fluid pressure 106 and LP fluid pressure 116 may be comparable to each other, but may be significantly smaller than the pressure of HP fluid pressures 102, 112, as HP fluid pressures 102, 112 represent the pressure of fluid before being reduced by passing through orifices 44, 46. For example, the magnitude of LP fluid pressure 106 and/or 116 may be less than 15% of the magnitude of the maximum pressure of HP fluid pressure 102, 112.

FIG. 3A is a chart illustrating exemplary conditions of fuel injector 12 when injecting fuel during moderate or high-load conditions of the internal combustion engine. In this fuel injection event, a position or displacement 104 of injection member assembly 30 in FIG. 3A represents a distance of injection member assembly 30 away from a valve seat, with the lowest displacement 104 representing a fully closed position of injection member assembly 30, and a maximum position 104 representing a fully opened position. The maximum displacement 104 may correspond to the length of gap 58 with injection member assembly 30 collapsed, as shown in FIG. 2A.

LP fluid pressure 106 may remain at a relatively low level during fuel injection events associated with moderate or high-engine loads. This may drive lift control element 52 to the closed position (FIG. 2B) during the period of time when pressure 102 and pressure 106 are both low. However, once pressure 102 reaches an elevated pressure, this higher pressure of hydraulic fluid supplied to high-pressure supply passage 42 may overcome the pressure of fuel supplied to biasing passage 48, moving lift control element 52 from the closed position to the open position. This movement is represented by lift control element displacement 108, with the lower level of displacement 108 corresponding to the position of lift control element 52 in FIG. 2B, and the higher displacement 108 corresponding to FIG. 2A.

As represented by injection rate 110, the actuation of injection member assembly 30 while in the collapsed state may allow the distal end of assembly 30 to move a relatively large distance away from one or more nozzle orifices 35, injecting fuel at a rate appropriate for moderate or high engine loads. A reduced injection rate 120, as shown in FIG. 3B, may be enabled by suppling an increased pressure 116. This pressure may be increased by generating a command to pressure control valve 16 to permit a flow of hydraulic fluid to biasing passage 48 having a pressure that is not overcome by the pressure within high-pressure supply passage 42, even when pressure 112 reaches a high level. Thus, lift control element displacement 118 may remain at the low level in FIG. 3B, which corresponds to the seated position of lift control element 52 shown in FIG. 3B. In turn, injection member assembly 30 may remain in an expanded configuration, limiting displacement 114 of injection member assembly 30. This may reduce the injection rate 120 of fuel injected via orifices 35.

Figure 4:
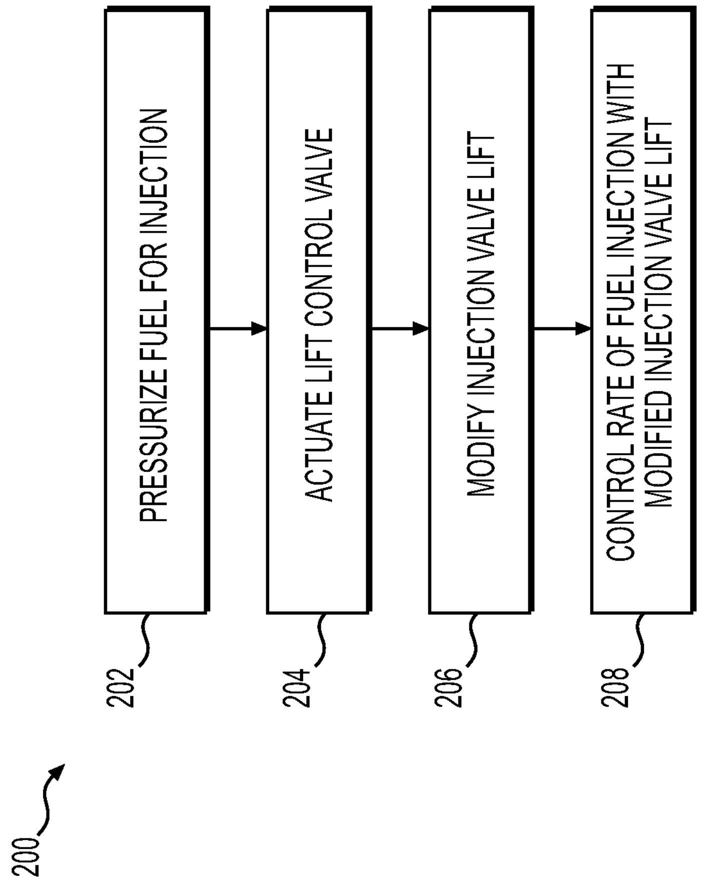
FIG. 4 is a flowchart depicting an exemplary fuel injection method, according to aspects of the disclosure.

With reference to FIG. 4, method 200 may be performed during the operation of system 10 to control a fuel injection rate by modifying lift of an injection valve, such as injection member assembly 30. Method 200 may include a step 202 during which fuel is pressurized for injection. For example, fuel may be pressurized by closing spill valve 20 and by driving piston 14 with a cam or other suitable mechanism. The pressurization of fuel during step 202 may correspond to pressure 102 and pressure 112, as described above. Pressurized fuel may be supplied to high-pressure supply passage 42, and may be in communication with hydraulic fluid chamber 60 via orifice 44.

A step 204 may include actuating lift control valve 34. For example, during one or more fuel injections, lift control element 52 may remain in the closed position illustrated in FIG. 2B and described above with respect to FIG. 3B, in order to reduce the size of gap 58 and thus restrict fuel injection rate 120. During one or more additional injections performed during method 200, lift control element 52 may be actuated from this closed position to an open position, as shown in FIG. 2A.

A step 206 may include modifying an amount of injection valve lift. This modification may result from the actuation of lift control valve 34. For example, in a first injection, element 52 of lift control valve 34 may remain in a closed position associated with the expanded configuration of injection member assembly 30. This expanded configuration may provide a restricted amount of lift. During at least a portion of a second injection, lift control element 52 may be actuated from the closed position to the open position, placing injection member assembly 30 in a collapsed configuration that provides a greater amount of lift.

A step 208 may include controlling the rate of fuel injection with the modified amount of injection valve lift. For example, ECM 80 may be programmed to cause the actuation of lift control element 52, and the resulting modification of injection valve lift, by generating a command to increase or decrease the pressure of fuel supplied via pressure control valve 16. Thus, pressure control valve 16 may supply fluid pressure 106 at a relatively low level that allows injection member assembly 30 to collapse for at least a portion of a fuel injection event, and may supply pressure 116 at a relatively high level to lock lift control element 52 in place for one or more other injection events. This may allow ECM 80 control the injection rate of fuel by enabling a first injection rate 110 and a reduced injection rate 120.

In some aspects, step 208 may be performed for a plurality of fuel injectors 12 at the same time. For example, pressure control valve 16 may regulate or otherwise set the pressure of fuel supplied to a plurality of fuel injectors 12 (e.g., a series of fuel injectors connected on a particular cylinder bank of an internal combustion engine). Thus, pressure control valve 16 may modify the lift for a plurality of cylinders by switching the pressure of fluid supplied via pressure control valve 16 between a low fluid pressure 106 and a relatively high fluid pressure 116. The magnitude of pressure 116 may be dependent on the diameters of high-pressure orifice 44 and low-pressure orifice 46, as described above.

While steps 202, 204, 206, and 208 were described in an exemplary order, as understood, one or more of these steps may be performed in a different order, or in a partially or fully overlapping manner. One or more of steps 202, 204, 206, and 208 may be performed during different injection events of a single continuous operation of system 10 extending from start-up to shut-off. For example, step 202 may be performed for each injection event, while steps 204, 206, and 208 are performed periodically.

While the above-described exemplary fuel injector 12 is a mechanically-actuated electronically-controlled unit injector, fuel injector 12 may instead be a common rail fuel injector, a gaseous fuel injector, or another type of fuel injector. In these and other configurations, the hydraulic fluid supplied to lift control valve 34 may be engine oil or another incompressible fluid, instead of fuel.

The disclosed system and method may facilitate accurate injections of relatively small pilot, main, and/or post injections by providing a fuel injector with a controllable and modifiable amount of lift. Reducing valve lift in a controllable manner may reduce engine noise, reduce the production of unwanted and/or harmful emissions, and improve engine stability when small fuel injections are desirable. Allowing the valve lift to change between different fuel shots may facilitate a large turn-down ratio, while enabling precise control over both large and small fuel injections. Controlling engine lift with engine fluid, such as liquid fuel, may provide a simplified system design, and may avoid the need to supply separate hydraulic fluid or provide an additional solenoid valve for each individual fuel injector. Additionally, the disclosed system and method may enable simultaneous control over valve lift for a plurality of fuel injectors without the need to generate individual valve lift commands to a series of fuel injectors.

It will be apparent to those skilled in the art that various modifications and variations can be made to the disclosed system and method without departing from the scope of the disclosure. Other embodiments of the system and method will be apparent to those skilled in the art from consideration of the specification and system and method disclosed herein. It is intended that the specification and examples be considered as exemplary only, with a true scope of the disclosure being indicated by the following claims and their equivalents.

What is claimed is:

1. A fuel injection system, comprising:

a fuel supply passage configured to receive a pressurized fuel;

a nozzle orifice downstream of the fuel supply passage;

a control chamber configured to receive pressurized fuel;

an injection valve configured to move when the pressurized fuel is drained from the control chamber to open the nozzle orifice, and configured to close the nozzle orifice when the pressurized fuel is present in the control chamber, the injection valve having an expanded configuration in which a portion of the injection valve moves proximally away from a distal end of the injection valve, the expanded configuration being associated with a first lift, and a contracted configuration being associated with a second lift, the first lift being different than the second lift; and a lift control valve that is actuated by fuel and that is connected to a fuel supply in a manner that supplies fuel to the lift control valve separate from fuel supplied to the control chamber and configured to cause the injection valve to change from a first length associated with a first pressure of the fuel to a second length associated with a second pressure of the fuel that is greater than the first pressure.

2. The fuel injection system of claim 1, further including a fluid chamber configured to receive the fuel to change the injection valve from the first length to the second length.

3. The fuel injection system of claim 2, wherein the fluid chamber is in fluid communication with the fuel supply passage and with the lift control valve.

4. The fuel injection system of claim 2, wherein the fluid chamber is located within the injection valve.

5. The fuel injection system of claim 1, wherein the lift control valve includes a valve member configured to permit a flow of fuel when the injection valve has the first length and block a flow of fluid when the injection valve has the second length, the second lift associated with the second length being smaller than the first lift associated with the first length.

6. The fuel injection system of claim 1, further including an electronically-controlled valve configured to adjust a pressure of fuel supplied to the lift control valve.

7. The fuel injection system of claim 6, further including an electronic control unit configured to cause the electronically-controlled valve to modify a pressure of the fuel supplied to actuate the lift control valve.

8. A fuel injection system, comprising:

a nozzle orifice configured to inject fuel into an internal combustion engine;

a needle valve assembly including an expandable body formed with an extendable portion and a distal portion, the distal portion being configured to open and close the nozzle orifice, the expandable body having an expanded position that reduces a maximum lift of the needle valve assembly by increasing a length of the needle valve assembly; and a fuel-actuated control assembly configured to cause the extendable portion of the needle valve assembly to extend.

9. The fuel injection system of claim 8, wherein the extendable portion is secured within an interior of the needle valve assembly.

10. The fuel injection system of claim 8, wherein the control assembly includes a lift control element that has a first position configured to cause the needle valve assembly to contract and a second position configured to cause the needle valve assembly to expand.

11. The fuel injection system of claim 10, wherein the control assembly includes a hydraulic fluid drain, wherein the lift control element is configured to block the drain when the needle valve assembly is expanded.

12. The fuel injection system of claim 10, further including an electronically-controlled valve configured to cause the lift control element to move from the first position to the second position according to a pressure of fuel supplied to the needle valve assembly.

13. A fuel injection method, comprising:

receiving fuel with a fuel injector for an internal combustion engine;

pressurizing the fuel for injection into the internal combustion engine via an injection member assembly;

actuating a lift control valve between a first position associated with a first lift in which the injection member assembly has a first length and a first maximum amount of travel and a second position associated with a second lift in which the injection member assembly has a second length and a second maximum amount of travel, the second maximum amount of travel being reduced as compared to the first maximum amount of travel, the lift control valve blocking a fluid path to a hydraulic fluid chamber of the injection member assembly; and injecting the pressurized fuel with an injection rate that is controlled according to the second lift while the lift control valve is in the second position.

14. The fuel injection method of claim 13, wherein the lift control valve is hydraulically-actuated.

15. The fuel injection method of claim 13, wherein the lift control valve is biased to the second position by a fluid.

16. The fuel injection method of claim 13, wherein the second position causes the injection member assembly to expand.

17. The fuel injection method of claim 13, wherein, when the lift control valve is in the first position, a fluid path is connected between the lift control valve and a passage for supplying pressurized fuel to an injector orifice.

18. The fuel injection method of claim 13, wherein, when the lift control valve is in the second position, a lift control element blocks a fluid path to the hydraulic fluid chamber of the injection member assembly, the lift control element being displaced according to a pressure of hydraulic fluid, the hydraulic fluid being fuel.

19. The fuel injection method of claim 13, further including generating a command to an electronically-controlled valve outside of the fuel injector to actuate the lift control valve.

20. The fuel injection method of claim 13, further including actuating a plurality of lift control valves with a single control valve.

* * * * *